Dec. 2, 1969  O. W. SCHEFLOW  3,481,357
PRESSURE REGULATOR ASSEMBLY
Filed May 5, 1966
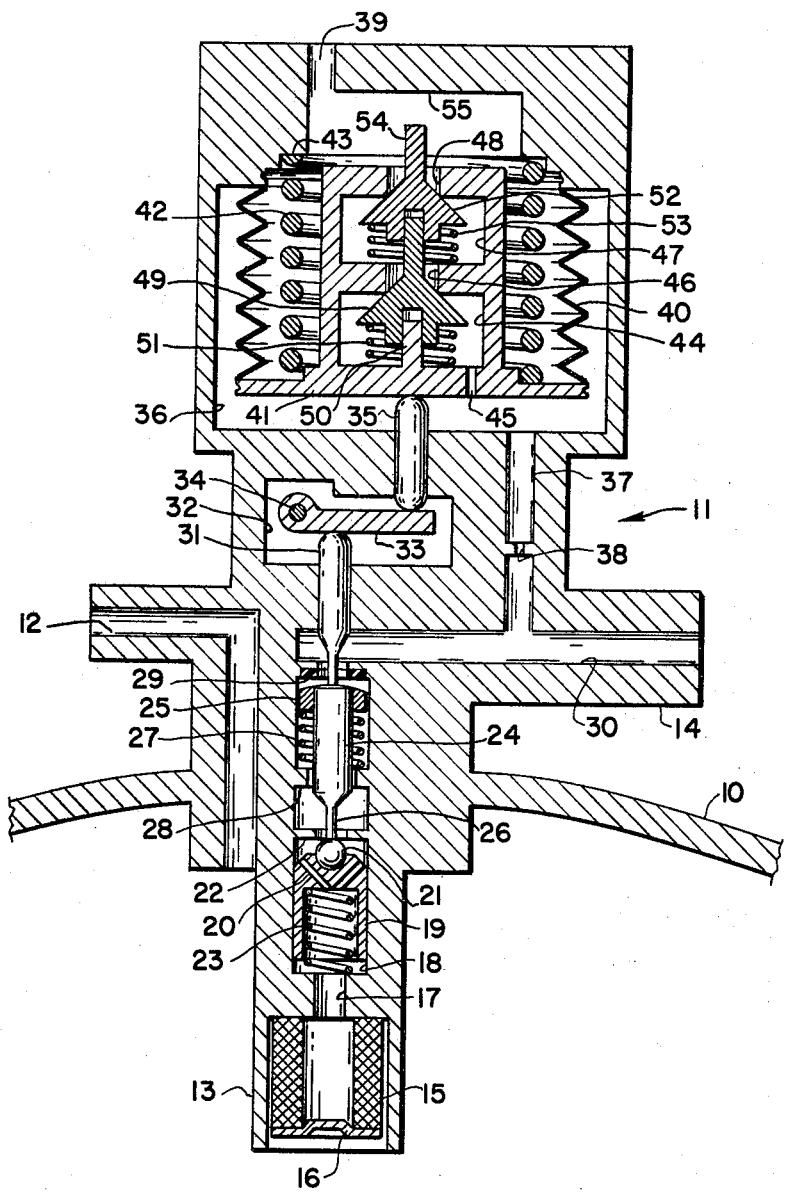
INVENTOR.
OLIVER W. SCHEFLOW
BY
ATTORNEY United States Patent Office 3,481,357
Patented Dec. 2, 1969

3,481,357
PRESSURE REGULATOR ASSEMBLY
Oliver W. Scheflow, Kalamazoo, Mich., assignor to Pneumo Dynamics Corporation, Cleveland, Ohio, a corporation of Delaware
Filed May 5, 1966, Ser. No. 547,837
Int. Cl. G05d 16/06, 7/01
U.S. Cl. 137—116.5    9 Claims

ABSTRACT OF THE DISCLOSURE

A fluid pressure regulator assembly including a primary valving section having a valve element and cooperable seat both made of metal for regulating the flow from the inlet to the outlet, and a secondary section downstream of and in series with the primary section including a valve element and seat one of which is made of a relatively soft resiliently deformable material to provide redundant sealing in the event of leakage past the primary section after closing, and a pressure sensor for controlling the opening and closing movements of the primary and secondary sections.

---

This invention relates to fluid pressure regulators and has for a primary object the provision of such a regulator of improved reliability and integrity.

It is of more particular concern to provide a fluid regulator designed and constructed for use in environments where maintenance, corrective adjustments and other attention to the assembly would either be impossible or highly impractical, with such a regulator thus intended and required to serve its predetermined regulating function reliably over a long period of time or the design life of the assembly. Such construction entails judicious selection of materials for long life characteristics. and an efficient functional design and arrangement of components for the desired operational reliability, with the design preferably also such to anticipate the possibility of some imperfection occurring in the primary regulating section and provide an incorporated compensation to maintain the proper regulation.

The new regulator is improved in respect of such desiderata principally by the provision of a secondary valving section in series with the primary section, there being more particularly a primary seat and a secondary or redundant seat with the former exhibiting hard seat characteristics and the latter having a much softer configuration. A hard seat has little or no tolerance for dirt particles and the like, but an extremely hard characteristic can be realized in the new regulator in view of the redundant seat in series to operate in the event of leakage at the primary seat and having extremely good dirt digestion properties. It is also preferred that the primary and secondary sealing seats for the new regulator be in combined form for coaction with a single pressure sensing device in the assembly to further enhance reliability.

When the regulator is designed to be used as a presurized assembly throughout its life, a topping relief section is required, and a further object of the invention is to provide an improved relief mechanism again principally in respect of reliability of operation. Such relief section is utilized to top the system in the event of excessive leakage or downstream pressure increase such as could result when the regulator is allowed to remain locked up for an extended period of time, and the mechanism is designed so that the normal relief sealing forces remain intact until the exact moment the relief is needed.

It is another object of the invention to provide such a regulator in which the relief valve assembly includes a redundant sealing seat for added reliability and functional integrity, with the full combination accordingly having series secondary seats in both the main valving and relief valve sections.

Another object is to provide a pressure regulating assembly improved in the noted respects and yet emboding a relatively simple single stage configuration of a minimum number of parts and compact size.

Other objects and advantages of the present invention will become apparent as the following description proceeds.

To the accomplishment of the foregoing and related ends the invention, then comprises the features hereinafter fully described and particularly pointed out in the claims, the following description and the annexed drawing setting forth in detail a certain illustrative embodiment of the invention, this being indicative, however, of but one of the various ways in which the principle of the invention may be employed.

The single figure of the drawing shows in longitudinal section a simplified form of pressure regulator in accordance with the present invention.

Referring now to the drawing in detail, the fragmented curved walls 10 represents a portion of the top of a storage tank in which the pressure fluid to be regulated is contained and reference numeral 11 designates generally the regulator mounted in penetrating relation in such portion of the top of the tank. The fluid is supplied to the interior of the tank through a fill passage 12 in the regulator body, while the projecting inner end of the regulator within the tank forms an inlet 13 thereto and the fluid can proceed through regulator operating sections to be described to the exterior regulator outlet 14 for delivery to the system served by the pressure fluid.

The regulator inlet 13 is cylindrical and is recessed to receive a hollow cylindrical filter 15 closed by a plate 16 at its outer end and against the bottom of the recess about the continuation passage 17 therefrom in the regulator body. The pressure fluid, with gaseous nitrogen as an example, is thus required to flow through the filter before entering the regulator proper to restrain particles from the storage tank from entering the valve section. This filter should produce only a very small pressure drop, and a filter of pleated wire mesh-mandrel configuration has been found to be very suitable for the purpose.

The inlet continuation passage 17 leads to an enlarged body cavity 18 in which there is a primary poppet 19 generally of a hollow cylindrical form open at the bottom and having a top closure in which a series of through passages 20 is provided. The top of the poppet 19 is provided with a center hemispherical recess in which a ball 21 is supported as a valve element to cooperate with a primary seat 22 shown as defined by an annular partition in the body cavity 18. A relatively light coil spring 23 is disposed within the primary poppet and acts against the bottom of the body cavity 18 to extend or elevate the poppet and normally hold the ball 21 in sealing engagement with the primary seat 22 together with the supply pressure in a manner which will be more fully described hereinbelow.

The ball and primary seat are made of very hard material or materials and precisely formed to provide extremely close regulation with low leakage tendency and exceptional life expectancy. As a more particular example, the hard seat combination has utilized a carbide ball on a stainless steel seat and this combination has the additional advantage of being non-magnetic, whereby small metallic particles will not adhere to the critical surfaces. Other specific configurations can be employed in lieu of the ball, for example, presenting flat or conical as well as the spherical surface, with the hardness being of prime importance for the stated reasons.

A secondary poppet 24 is disposed and movable axially in an upper portion of the body cavity 18, with this poppet having a spherical head 25, which could also be for example flat or conical as well, at its upper end and a pin extension 26 at its lower end which extends sufficiently downwardly to contact the ball 21 as in the illustrated condition of the assembly. A coil spring 27 surrounds the secondary poppet in engagement with the underside of the head and at its opposite end with a partial annular partition 28 through which the body of the poppet extends with sufficient clearance for the fluid to pass therethrough without being impeded.

The spherical head of the secondary poppet 24 coacts with a secondary seat 29, the spring 27 normally biasing this poppet in the direction of the secondary seat. The latter is shown as a flat washer and is made of relatively soft and readily conformable material which will not be adversely affected by exposure to the pressure fluid being regulated in the assembly. This secondary seat is only used as a redundant sealing seat and has no significant effect on the regulation as a practical matter. It is preferred that this seat be made of a non-filled "Teflon," a polytetrafluoroethylene compound supplied by E. I. du Pont de Nemours & Co. under such name, with a homogenous structure. This "Teflon" element should be free of cracks, flakes, and any other surface irregularities which could form undesirable leakage paths if occurring across or near the actual sealing surface. The soft "Teflon" secondary seat can also be provided with an elastomeric back-up seal as an additional safety against extraneous leakage apart from the metering orifice if desired, with silicone and butyl elastomeric seals examples of such added elements.

The redundant or series secondary seat 29 provides communication between the body cavity 18 and a passage 30 leading to the regular outlet 14. This passage extends laterally and is traversed by a plunger 31 vertically reciprocable in the body in alignment with the secondary poppet, all of the primary and secondary poppets and seats and plunger being on the same axis. The plunger 31 at its lower end has a reduced pin form which extends through the secondary seat 29 for engagement with the top of the secondary poppet 24, while the upper end of the plunger is received in a separate cavity 32 of the body in engagement with a generally horizontal lever 33 mounted to the body by an end pivot 34 having an axis normal to the lever. The engagement of plunger 31 with the underside of lever 33 is relatively close to the pivoted end of the latter and a separate vertical pin 35 is in engagement with the upper surface of the lever near the free end thereof, the pin 35 passing slidably through a body portion to extend from the cavity 32 to a further enlarged cavity 36 in the upper portion of the regulator.

This last cavity 36 is in communication with the regulator outlet 14 through a passage 37 extending therefrom through a damping orifice 38 to the lateral body passage 30, and cavity 36 is further provided with a top vent opening 39. A bellows type of pressure sensing device is housed in this upper large regulator cavity and comprises, more particularly, a welded diaphragm metal bellows 40, a combination end cap and hollow core 41, and a power spring 42 about the core piece with its ends respectively engaged with the end cap and a regulator body shoulder 43. The bellows end cap is at the bottom and engages the upper end of the pin 35.

The hollow core section of the sensing device contains the relief valve mechanism of the regulator and has a lower chamber 44 communicating with the body cavity 36 by means of an end cap passage 45. A partial annular wall forms a first relief seat 46 which leads to an upper core chamber 47 in the top of which there is a second relief seat 48, the latter providing communication to the top portion of the body and the vent 39 therein.

A first relief valve poppet 49 is disposed in the lower sensor core chamber 44 with an intermediate conical section for engaging the first relief seat 46. The poppet is slidable on an upstanding pin form 50 integral with the end cap and a bias coil spring 51 is engaged between the inner cap surface and the underside of the conical sealing section of poppet 49 to hold the conical surface of the latter normally in sealing engagement with the first relief seat. This is the condition of the mechanism illustrated in the drawing, and it will be seen that there is a predetermined clearance between the end of the guide pin 50 and the end of the socket of the poppet body in which it is received.

The first relief poppet 49 has an upper pin extension projecting into the upper chamber 47 and telescopically into a socket in a second relief poppet 52 of similar configuration. The second relief poppet thus has also an enlarged conical section urged against the second relief seat 48 by a spring 53. In the illustrated closed condition of this further seat combination, there is again predetermined clearance between the end of the pin extension of the first relief poppet 49 and the end of the socket in the second poppet 52 in which it is slidably fitted. Similarly, the second poppet has an upper pin extension 54 which projects into the vented top cavity of the regulator. The bellows 40 is sealed to the regulator body, so that fluid venting can only be accomplished through the relief valve mechanism which will be seen to comprise a first seat and a second redundant seat in series.

With regard now to the operation of the new regulator, the drawing shows the assembly in the delivery or open condition, and it will be understood that the power spring 42 is initially adjusted or preloaded to give the desired regulated pressure. In this operating condition, the gas or fluid proceeds from the interior of the storage tank through the filter 15 and inlet passage 17, the primary poppet 19 and its passages 20, through the primary hard seat 22, around the secondary poppet 24, which is also preferably of stainless steel, and across the secondary sealing seat 29 to passage 30 and the outlet 14. The regulated pressure is sensed in the bellows cavity 36 through the damping orifice 38 of connecting passage 37 and a force is exerted on the bellows 40 in opposition to the power spring. An increase in the downstream pressure causes the bellows to lift or retract against the spring force, and the primary poppet spring 23 together with the supply pressure of the fluid raise the ball 21 against the primary hard seat 22 to close this metering orifice.

The travel of the ball 21 in thus moving from the open to the closed position relative to the primary hard seat 22 is less than that which is effective to move the spherical sealing surface 25 of the secondary poppet 24 against the redundant soft seat 29, so that normal full closure at the first or primary metering orifice is not accompanied by closure of the redundant seat. When the downstream pressure reduces below the power spring force, the bellows extends to move the pin 35 downwardly, with the pivoted lever 33 being rocked to force the plunger 31 down; this plunger movement causes the secondary valve poppet 24 also to be moved downwardly and by virtue of engaging the ball 21 to depress the latter away from the primary seat 28, the primary metering orifice thereby being opened for flow of the gas or fluid.

In the event of leakage at the primary seat when locked up or closed, the downstream pressure will continue to increase and the bellows will be further collapsed or raised permitting a further degree of movement of the valving assembly. This added degree of movement allows the secondary poppet spring 27 to lift the poppet 24 and close the secondary metering orifice by engagement of the spherical sealing surface 25 with the soft redundant seat 29.

Should the downstream pressure continue to increase for any reason, it will be apparent that the bellows will move away from the pin 35 and continue to rise until the second relief poppet 52 is moved into contact with the normally spaced opposed surface 55 of the regulator body. Still further collapse of the bellows will accordingly move the secondary relief seat 48 away from the secondary relief poppet 52 against the bias of spring 53 and this will relieve any pressure in the upper chamber 47 by the resulting venting thereof through the secondary relief seat. The actual relieving of the regulated downstream pressure does not occur until there is a further increment of movement of the core structure 41 of the bellows equal to the clearance provided in the telescopic interfit of the second and first relief poppets. Relative movement beyond this lost motion causes the first relief poppet 49 to open, and the relief valve mechanism thus relieves the downstream pressure sufficiently to equalize the internal leakage occurring at the secondary soft seat 29. Should the condition or condition causing the leakage clear, then the assembly will readjust accordingly. The secondary poppet can if desired be attached to the bellows assembly for greater sealing force with increasing the lock-up pressure.

It will be noted that the design of the relief valve mechanism is such that the relief valve sealing force increases as the pressure increases thereby affording better seating characteristics. Moreover, the carrying or containment of this mechanism in the bellows assembly permits the relief valve sealing forces to be maintained without reduction until the exact moment they are required.

Both the primary and redundant seats are thus combined for actuation by the same bellows sensing device which enhances reliability, and the illustrated pin and lever assembly will be seen to provide a mechanical advantage of about three to one by virtue of the locations of the points of engagement respectively of the pin 35 and plunger 31 with the pivoted lever 33. This method of actuation provides good regulation over a wide range of inlet pressures in a relatively compact unit, and it will also be appreciated that the new regulator design presents a relatively simple configuration utilizing only a relatively small number of components.

I, therefore, particularly point out and distinctly claim as my invention:

1. A fluid pressure regulator assembly comprising an internally chambered body having an inlet and an outlet for fluid flow therethrough, valving means within the body for regulating such flow, said valving means including a primary section and a secondary section downstream of and in series with said primary section, the primary section being formed by a valve element and cooperable seat both made of metal for regulating the flow from said inlet to said outlet, and the series secondary section being formed of a valve element and seat one of which is made of a relatively soft resiliently deformable material to provide redundant sealing in the event of leakage past said primary section after closing, and actuating means for opening the primary and secondary sections when the pressure of the fluid at the outlet side is below a predetermined value, closing the primary section while maintaining the secondary section open upon increase of such pressure to such value, and closing the secondary section upon a further increase in such pressure to provide such redundant sealing as aforesaid, said actuating means including a bellows pressure sensor, relief valve means within said bellows, biasing spring means normally urging the primary and secondary section valve elements in closing direction, means for urging said bellows pressure sensor in the opposite direction, and a single motion transmitting connection between said bellows pressure sensor and said valve elements.

2. A fluid pressure regulator assembly as set forth in claim 1, wherein said relatively soft material consists essentially of polytetrafluoroethylene.

3. A fluid pressure regulator assembly as set forth in claim 1, wherein the primary section valve element and seat are of a non-magnetic metal.

4. A fluid pressure regulator assembly as set forth in claim 1, wherein the primary section valve element and seat are non-magnetic, and the relatively soft material of which one of the secondary section valve element and seat is made consists essentially of polytetrafluoroethylene.

5. A fluid pressure regulator assembly comprising an internally chambered body having an inlet and an outlet for fluid flow therethrough, valving means within the body for regulating such flow, said valving means including a primary section and a secondary section downstream of and in series with said primary section, the primary section being formed by a valve element and cooperable seat both made of metal for regulating the flow from said inlet to said outlet, and the series secondary section being formed of a valve element and seat one of which is made of a relatively soft resiliently deformable material to provide redundant sealing in the event of leakage past said primary section after closing, and actuating means for opening the primary and secondary sections when the pressure of the fluid at the outlet side is below a predetermined value, closing the primary section while maintaining the secondary section open upon increase of such pressure to such value, and closing the secondary section upon a further increase in such pressure to provide such redundant sealing as aforesaid, said actuating means including biasing spring means normally urging said primary and secondary section valve elements in closing direction, pressure sensor means for opposing the movements of said primary and secondary section valve elements in the closing direction, and first and second relief valves in series relation movable with said pressure sensor means.

6. A fluid pressure regulator assembly as set forth in claim 5, wherein said pressure sensor means is contained in a cavity having restricted fluid communication with said outlet on one side of said pressure sensor means and said cavity is vented on the other side of said pressure sensor means.

7. A fluid pressure regulator assembly as set forth in claim 6, wherein said first and second relief valves are contained in a core supported by said pressure sensor means, said core having first and second chambers for said first and second relief valves, said first chamber being in fluid communication with the outlet pressure side of said cavity, said first and second chambers being in communication with each other through said first relief valve, and said second chamber being in communication with the vented side of said cavity through said second relief valve.

8. A fluid pressure regulator assembly as set forth in claim 7, further comprising means for opening said second relief valve when the outlet pressure reaches a predetermined higher value, and subsequently opening said first relief valve when the outlet pressure reaches a still higher value.

9. A fluid pressure regulator assembly as set forth in claim 7, wherein said core has a pin projecting therefrom into said first chamber, and said first relief valve has a socket for receipt of said pin and an extension projecting into said second chamber and telescoping into a socket in said second relief valve.

References Cited
UNITED STATES PATENTS

| | | | |
|---|---|---|---|
| 862,867 | 8/1907 | Eggleston | 251—61.1 |
| 1,660,842 | 2/1928 | Hoesel | 137—630.22 |
| 1,821,189 | 9/1931 | Meinken | 137—116.5 |
| 2,645,452 | 7/1953 | Lucas | 251—368 |
| 3,042,064 | 7/1962 | Pommersheim | 137—116.5 |
| 3,087,232 | 4/1963 | Dow | 251—368 |

WILLIAM F. O'DEA, Primary Examiner

HOWARD M. COHN, Assistant Examiner

U.S. Cl. X.R.

137—630.22